(12) United States Patent
Sanjeevaiah et al.

(10) Patent No.: US 12,084,568 B2
(45) Date of Patent: *Sep. 10, 2024

(54) THERMOPLASTIC ELASTOMER COMPOSITION FOR OVERMOLDING POLYAMIDES

(71) Applicant: Star Thermoplastic Alloys & Rubbers, Inc., Broadview, IL (US)

(72) Inventors: Prakash Sanjeevaiah, Orland Park, IL (US); Krishna Venkataswamy, Crystal Lake, IL (US); Pei-Zhen Jian, Claredon Hills, IL (US)

(73) Assignee: Star Thermoplastic Alloys and Rubbers, LLC, Broadview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,901

(22) Filed: Jun. 9, 2023

(65) Prior Publication Data

US 2023/0312898 A1    Oct. 5, 2023

Related U.S. Application Data

(63) Continuation of application No. 17/132,433, filed on Dec. 23, 2020, now Pat. No. 11,713,390.

(60) Provisional application No. 62/953,726, filed on Dec. 26, 2019.

(51) Int. Cl.
| | |
|---|---|
| *C08L 23/16* | (2006.01) |
| *C08J 7/04* | (2020.01) |
| *C08L 23/08* | (2006.01) |
| *C08L 23/12* | (2006.01) |
| *C08L 23/26* | (2006.01) |
| *C08L 53/02* | (2006.01) |

(52) U.S. Cl.
CPC ............ *C08L 23/16* (2013.01); *C08J 7/0427* (2020.01); *C08L 23/0815* (2013.01); *C08L 23/12* (2013.01); *C08J 2377/00* (2013.01); *C08J 2423/08* (2013.01); *C08J 2423/16* (2013.01); *C08L 23/26* (2013.01); *C08L 53/025* (2013.01); *C08L 2205/035* (2013.01); *C08L 2205/08* (2013.01); *C08L 2207/04* (2013.01)

(58) Field of Classification Search
CPC .......... C08L 23/16; C08L 51/06; C08L 53/00; C08L 23/04
See application file for complete search history.

(56) References Cited

U.S. PATENT DOCUMENTS

| | | | | |
|---|---|---|---|---|
| 11,713,390 B2 * | 8/2023 | Sanjeevaiah | ............ | B32B 27/20 |
| | | | | 525/89 |
| 2011/0143112 A1 * | 6/2011 | Cai | ......... | B32B 7/022 |
| | | | | 525/89 |
| 2013/0296519 A1 * | 11/2013 | Lee | ........ | C08F 210/06 |
| | | | | 526/348.5 |
| 2017/0113393 A1 * | 4/2017 | Krueger | .................. | B60J 10/18 |

* cited by examiner

*Primary Examiner* — Mark S Kaucher
(74) *Attorney, Agent, or Firm* — Curatolo Sidoti & Trillis Co., LPA; Salvatore A. Sidoti; Floyd Trillis, III

(57) ABSTRACT

A thermoplastic elastomer composition for overmolding a predominantly polyamide substrate, a method for the preparation of an overmolded article, and an overmolded article having a layer of thermoplastic elastomer is provided. The thermoplastic elastomer composition comprises a thermoplastic vulcanizate, an olefinic block copolymer, and a maleated functionalized polyolefin copolymer. The method for the preparation of the overmolded article comprises heating the thermoplastic elastomer composition followed by applying the heated composition to at least a portion of the predominantly polyamide substrate.

23 Claims, No Drawings

THERMOPLASTIC ELASTOMER COMPOSITION FOR OVERMOLDING POLYAMIDES

CROSS REFERENCE TO RELATED APPLICATIONS

This application claims priority from U.S. Ser. No. 17/132,433, filed Dec. 23, 2020, which claims the benefit of the filing date under 35 U.S.C. § 119(e) from U.S. Provisional Patent Application Ser. No. 62/953,726, filed Dec. 26, 2019, both of which are hereby incorporated by reference in their entireties.

TECHNICAL FIELD

The disclosure relates to overmold compositions and overmold layers for polyamide articles, methods of preparing the overmold compositions, methods of overmolding layers on polyamide articles, and polyamide articles having an overmold layer of the overmold composition.

BACKGROUND

A variety of tool handles that were previously made out of wood or metal are now often made from injection-molded nylon, which is a common term for polyamide polymers. The type of nylon may vary from one tool to another to accommodate the particular rigid core element to be sheathed in the nylon, which may be molded over a steel shaft or reinforced with glass fiber. A drawback of nylon handles is that they feel hard on an individual's hand, and do not provide adequate cushioning against impact or vibration.

It is possible to at least partially overmold (OM) a shaped article made from a polyamide, with a thermoplastic elastomer (TPE) layer which exhibits properties between those of crystalline or glassy plastics and soft rubbery elastomers which are readily deformable by pressure. A thermoplastic elastomer softens upon heating, and in a molten state may be readily thermoformed by known processing techniques as an overmolded layer to adjust the feel of the grip on a handle of a tool.

There is a particular need for an overmold thermoplastic elastomer which will adhere and remain tightly adhered to a surface of a shaped nylon article, regardless of the type of nylon, its additives, its reinforcements, the process of preparing the nylon, the process conditions of its molding, and its aging history.

There is also a need to provide overmold compositions and overmold layers for polyamide handles that exhibit improved resistance to oil as compared to known overmold layers.

SUMMARY

According to certain illustrative embodiments, disclosed is a thermoplastic elastomer composition for overmolding a predominantly polyamide substrate, the thermoplastic elastomer composition comprising a thermoplastic vulcanizate, an olefinic block copolymer, and a functionalized polyolefin copolymer.

Also disclosed is a method for preparing an overmolded article comprising forming at least one layer of a thermoplastic elastomeric composition comprising a thermoplastic vulcanizate, an olefinic block copolymer, and a functionalized polyolefin copolymer on a predominantly polyamide substrate.

According to certain embodiments, the method for forming an overmolded article comprises heating a thermoplastic elastomeric composition comprising a thermoplastic vulcanizate, an olefinic block copolymer, and a functionalized polyolefin copolymer, and applying the heated thermoplastic elastomer composition to a predominantly polyamide substrate.

According to certain illustrative embodiments, also disclosed is a predominantly polyamide article having at least one layer of a thermoplastic elastomer composition thereon, the thermoplastic elastomer composition comprising a thermoplastic vulcanizate, an olefinic block copolymer, and a functionalized polyolefin copolymer.

Also disclosed is an overmolded article produced by the method comprising forming at least one layer of a thermoplastic elastomeric composition comprising a thermoplastic vulcanizate, an olefinic block copolymer, and a functionalized polyolefin copolymer on a predominantly polyamide substrate.

According to certain embodiments, disclosed is an overmolded article produced by the method comprising heating a thermoplastic elastomeric composition comprising a thermoplastic vulcanizate, an olefinic block copolymer, and a functionalized polyolefin copolymer and applying the heated thermoplastic elastomer composition to a predominantly polyamide substrate.

DETAILED DESCRIPTION

The following text sets forth a broad description of numerous illustrative embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this application, which would still fall within the scope of the claims. All publications and patents cited herein are incorporated herein by reference.

Throughout the present disclosure, the use of the articles "a," "an," and "the" refer to one or to more than one (that is, at least one) of the grammatical object of the article. By way of example, and not in limitation, "a compound" means one compound or more than one compound.

Throughout the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions or methods for each value, and determining the range of values that produce compositions or methods with the desired degree of effectiveness in accordance with the present disclosure.

It should be understood that when a range of values is described in the present disclosure, it is intended that any and every value within the range, including the end points, is to be considered as having been disclosed. For example, "a range of from percent to 100 percent" of a component, compound, composition, ingredient, reactant, etc. is to be read as indicating each and every possible number along the continuum between 10 and 100. It is to be understood that the inventors appreciate and understand that any and all values within the range are to be considered to have been specified, and that the inventors have possession of the entire range and all the values within the range.

Provided is a thermoplastic elastomer composition for overmolding a shaped article, such as a shaped article made from a polyamide. According to certain illustrative embodiments, the thermoplastic elastomer composition for overmolding a predominantly polyamide substrate comprises a thermoplastic vulcanizate, an olefinic block copolymer, and a compatibilizer. The term "compatibilizer" as used herein refers to a component of the overmold composition that that enhances the blending of immiscible components of the overmold composition and improves the adherence or bonding of the overmold composition to a polyamide substrate.

According to certain illustrative embodiments, the thermoplastic elastomer composition for overmolding a predominantly polyamide substrate comprises a thermoplastic vulcanizate, an olefinic block copolymer, and a compatibilizer comprising a functionalized polyolefin copolymer.

According to certain illustrative embodiments, the thermoplastic elastomer composition for overmolding a predominantly polyamide substrate comprises a thermoplastic vulcanizate, an olefinic block copolymer, and a compatibilizer comprising an anhydride functionalized polyolefin copolymer.

According to certain illustrative embodiments, the thermoplastic elastomer composition for overmolding a predominantly polyamide substrate comprises a thermoplastic vulcanizate, an olefinic block copolymer, and a maleic anhydride functionalized polyolefin copolymer (also referred to herein as a maleated polyolefin).

According to certain illustrative embodiments, the thermoplastic elastomer composition for overmolding a predominantly polyamide substrate comprises a thermoplastic vulcanizate, an olefinic block copolymer, and a maleated polyethylene, maleated polypropylene, or combination of maleated polyethylene and maleated polypropylene.

According to certain embodiments, the thermoplastic elastomeric composition further comprises a hydrogenated styrenic block copolymer. According to other embodiments, the hydrogenated styrenic block copolymer comprises a styrene ethylene butylene styrene (SEBS) block copolymer.

The thermoplastic vulcanizate of the composition comprises at least one thermoplastic elastomer rubber and a plastic phase. The thermoplastic elastomer rubber may comprises a natural rubber, a synthetic rubber or a blend thereof. The thermoplastic elastomeric rubber may comprise, butyl rubber, styrene-ethylene-butadiene-styrene rubber (SEBS), styrene-butadiene-styrene rubber (SBS), or styrene-isobutylene-styrene (SIBS), which is dynamically vulcanized in a plastic phase.

The plastic phase of the thermoplastic vulcanizate may be a polyolefin. Suitable polyolefins include polypropylene, polyethylene or a mixture thereof, or polyolefin elastomer, or a reactor thermoplastic polyolefin. Suitable curing agents include peroxide-based or platinum-based catalyst for hydrosilation (also known as hydrosilylation), or phenol formaldehyde together with suitable halide such as zinc or stannous chloride. According to certain embodiments, the thermoplastic vulcanizate comprises EPDM rubber dynamically vulcanized in polypropylene using a hydrosilation cure with platinum catalyst. According to other embodiments, phenol formaldehyde cured thermoplastic rubber is used in the thermoplastic vulcanizate. Other suitable curing methods may include peroxide cure, sulfur cure, resin cure and the like. The curing method may be selected by one having skill in the art based on the thermoplastic elastomer formulation.

The thermoplastic elastomer may comprise a single rubber or a blend of rubbers. Suitable thermoplastic elastomer rubbers may include conjugated diene rubbers, ethylene-alpha-olefin rubbers, ethylene-alpha-olefin-diene monomer rubbers. unsaturated styrenic triblock copolymer rubbers, hydrogenated styrenic triblock copolymer rubbers, and combination thereof.

Without limitation, suitable conjugated diene rubbers may include styrene-butadiene rubber, polybutadiene rubber, polyisoprene rubber, and combinations thereof. Suitable ethylene-alpha-olefin rubbers may include copolymers of ethylene and C3-C8 alpha-olefins. Ethylene-alpha-olefin-diene monomer rubbers refer to terpolymers of ethylene, C3-C8 alpha-olefins and non-conjugated diene. Unsaturated styrenic triblock copolymer rubber may include styrene-isoprene-styrene and styrene-butadiene-styrene rubbers. Hydrogenated styrenic triblock copolymer rubber may include styrene-ethylene-propylene-styrene rubbers, styrene-ethylene-butadiene-styrene rubbers and combinations thereof.

The thermoplastic elastomeric overmold composition for polyamide substrates further comprises an olefin block copolymer. An olefin block copolymer (OBC) is a polymer having alternating blocks of hard (ie, highly rigid/crystalline) and soft (ie, highly elastomeric) segments. The thermoplastic elastomeric overmold composition may comprise at least one olefin block copolymer. That is, the thermoplastic elastomeric overmold composition may comprise a single olefin block copolymer or a blend of two or more olefin block copolymers. By way of illustration, the thermoplastic elastomeric overmold composition may comprise a blend of a first olefin block copolymer and a second olefin block copolymer that is different from the first olefin elastomeric copolymer. In certain embodiments, the olefinic block copolymer at may be used in the thermoplastic elastomer composition comprises at least one of polyethylene or polypropylene.

Suitable olefin block copolymers, also referred to as polyolefinic elastomers, for use in the present disclosure include thermoplastic polyolefins (TPOs) and reactor made thermoplastic polyolefins (r-TPOs). These elastomers are two component systems containing elastomers dispersed in a polyolefin continuous phase. According to certain illustrative embodiments, olefin block copolymers that belong to the class of r-TPOs are used to prepare the thermoplastic elastomer composition. These resins are made through single site catalysis process that includes hard, soft and hard segments. According to certain illustrative embodiment the olefin block copolymer may comprise an ethylene/alpha-olefin block copolymer where the hard segments are the ethylene segments and the soft segments are the alpha-olefin segments. According to further embodiments, the olefin block copolymer may comprise an ethylene/C3-C20 alpha-olefin block copolymer. The olefin block copolymer comprising an ethylene/C3-C20 alpha-olefin block copolymer may be prepared by a chain shuttling process. Without limitation, suitable olefinic block copolymers are commercially available under the trademark INFUSE.

In certain embodiments, the functionalized polyolefin polymer of the thermoplastic elastomer composition comprises at least one of a functionalized polyethylene or polypropylene. The term "functionalized polyolefin" refers to a polyolefin containing reactive functional groups. The functional groups, which may also be referred to as reactive groups, may include carboxylic acids, carboxylic acid derivatives, including acid anhydrides, acid chlorides, isocyanates, oxazolines, amines, hydroxides, and epoxides. According to certain illustrative embodiments, the functional group is an anhydride. According to other illustrative embodiments, the functional group is maleic anhydride. According to other illustrative embodiments, the functionalized polyolefin polymer is maleated polyethylene or maleated polypropylene. Without limitation, suitable maleic anhydride functionalized polyolefin polymers are commercially available from Univar under the trademark POLYBOND and from ExxonMobil under the trademark EXXELOR.

According to certain illustrative embodiments, the thermoplastic elastomer composition comprises from about 20 to about 42 weight percent, or from about 20 to about 36 weight percent, or from about 20 to about 33 weight percent, of at least one thermoplastic vulcanizate, based on the total weight of the thermoplastic vulcanizate, the olefinic block copolymer and the compatibilizer.

According to certain illustrative embodiments, the thermoplastic elastomer composition comprises from about 8 to about 40 weight percent, or from about 11 to about 35 weight percent, or from about 15 to about 25 weight percent, of at least one olefinic block copolymer, based on the total weight of the thermoplastic vulcanizate, the olefinic block copolymer and the compatibilizer.

According to certain illustrative embodiments, the thermoplastic elastomer composition comprises from 5 to about 25 weight percent, or from about 7 to about 22 weight percent, or from about 10 to about 18 weight percent, of at least one compatibilizer, based on the total weight of the thermoplastic vulcanizate, the olefinic block copolymer and the compatibilizer.

The thermoplastic elastomer overmold compositions may further include one or more common additives for elastomer compositions. For example, and without limitation, the thermoplastic overmold compositions may include one or more of antioxidants (such as phenolic antioxidants and phosphite antioxidants), antiozonants, reinforcing and non-reinforcing fillers, fibers (like glass, carbon fibers or carbon fibrils), extender oils, process oils, rubber plasticizers, heat stabilizers, waxes, UV light stabilizers, cross-linking agents, processing aids, lubricants, foaming agents, flame retardant packages, flow agents, rheology modifiers, tackifying agent, pigments and other coloring agents. Those skilled in the art will be able to select the type and suitable amount of the additives based on the properties of the additive(s) and the desired properties of the composition.

Suitable fillers used in the thermoplastic elastomer compositions disclosed herein include at least one of calcium carbonate, carbon black, silica, clays, talc, titanium dioxide, metal oxides, and the like, and combinations thereof. According to certain embodiments, the thermoplastic elastomer overmold compositions disclosed herein include at least one of carbon black, silica, or combinations thereof. Those skilled in the art will be able to select the type and suitable amount of the filler(s) based on the properties of the filler(s).

Process oils can be used to extend and soften the compositions disclosed herein. Examples of suitable process oils that may be used include, but are not limited to, paraffinic oils, aromatic oils, naphthenic oils, vegetable oils other than castor oils, and low polycyclic aromatic content. Those skilled in the art will be able to select the type and suitable amount of process oil to be used.

The thermoplastic elastomer composition is suitable for overmolding a portion of an article to prepare an overmolded article of manufacture. According to certain illustrative embodiments, the thermoplastic elastomer composition is suitable for overmolding a predominantly polyamide substrate to prepare an overmolded polyamide article. The predominantly polyamide substrate may comprise at least one of Nylon 6, Nylon 6/6, Nylon 6/12, Nylon 11, Nylon 12, glass filled Nylon 6, glass filled Nylon 6/6, glass filled Nylon 6/12, glass filled Nylon 11, glass filled Nylon 12, or additive modified Nylon grades. The thermoplastic elastomeric composition may be used to overmold polyamide articles prepared from a reinforced Nylon, such as a fiber-reinforced Nylon, filler-reinforced Nylon or glass-reinforced Nylon. The thermoplastic elastomeric composition may also be used to overmold polyamide articles prepared from a heat-stabilized Nylon. The reinforcing agent for the nylon article may include fibrous reinforcement, particulate reinforcement, or both. Suitable fiber reinforcement includes, without limitation, glass fibers, carbon fibers, graphite fibers, polymer fibers, inorganic fibers, such boron fibers, ceramic-fibers, metal fibers, metal alloy fibers, alumina fibers, alkaline earth silicate fibers, polycrystalline wool fibers, silica fibers, silicon carbide fibers, combinations of more than one of these types of fibers, and the like. Reinforcing agents may include a particulate mineral reinforcing agent. Suitable mineral reinforcing agents include, without limitation, wollastonite, micas, glass beads (solid or hollow), kaolin, and talc.

The thermoplastic elastomer compositions may also be suitable for overmolding other types of polar substrates, including, without limitation, acrylonitrile-butadiene-styrene (ABS) resins, polycarbonates, thermoplastic polyurethanes, thermoplastic copolyesters, and the like.

The various embodiments of the provided thermoplastic elastomer compositions for overmolding a predominantly polyamide substrate provide one or more beneficial attributes, which may include at least one of superior oil resistance, high peel strength, high adhesion, soft feel, improved gripping, and deformation with pressure.

The various embodiments of the provided thermoplastic elastomer compositions for overmolding a predominantly polyamide substrate provide one or more beneficial attributes while the thermoplastic elastomer compositions without the use of an adhesive between the thermoplastic elastomer composition and the substrate.

A method for preparing an overmolded shaped article made from a polyamide is provided. In particular, a method for the preparation of an overmolded article is provided, comprising bonding a thermoplastic elastomer composition to a predominantly polyamide substrate, the thermoplastic elastomer composition comprising a thermoplastic vulcanizate, an olefinic block copolymer, and a functionalized polyolefin copolymer, and optionally a hydrogenated styrenic block copolymer, the process comprising heating the thermoplastic elastomer composition to a temperature in the range from about 150 C to about 300 C, followed by applying the heated composition to at least a portion of the predominantly polyamide substrate. According to certain embodiments, the thermoplastic elastomeric composition is heated to a temperature in the range from about 200 C to about 250 C, followed by applying the heated composition to at least a portion of the predominantly polyamide substrate. According to certain embodiments, the thermoplastic elastomeric composition is heated to a temperature in the range from about 190 C to about 230 C, followed by applying the heated composition to at least a portion of the predominantly polyamide substrate.

A method for preparing an overmolded shaped article made from a polyamide is provided. In particular, a method for the preparation of an overmolded article is provided, comprising bonding a thermoplastic elastomer composition to a predominantly polyamide substrate, the thermoplastic elastomer composition comprising a thermoplastic vulcanizate, an olefinic block copolymer, and a maleic anhydride functionalized polyolefin copolymer, and optionally a styrene-ethylene-butadiene-styrene block copolymer, the process comprising heating the thermoplastic elastomer composition to a temperature in the range from about 150 C to about 300 C, followed by applying the heated composition to at least a portion of the predominantly polyamide substrate. According to certain embodiments, the thermoplastic elastomeric composition is heated to a temperature in the range from about 200 C to about 250 C, followed by applying the heated composition to at least a portion of the predominantly polyamide substrate. According to certain embodiments, the thermoplastic elastomeric composition is heated to a temperature in the range from about 190 C to about 230 C, followed by applying the heated composition to at least a portion of the predominantly polyamide substrate.

By way of illustration, and without limitation, methods for preparing overmolded shaped articles from the provided thermoplastic elastomer compositions may include injection overmolding, two-shot injection molding, coextrusion with a polyamide substrate, or multilayer blow molding over a polyamide substrate.

According to certain illustrative embodiments of the two-shot injection process, a Nylon part is molded in the first shot and the thermoplastic elastomer composition is molded over a portion of the molded Nylon part in the second shot.

According to other illustrative embodiments of the two-shot injection process, a Nylon part is molded and the thermoplastic elastomeric composition is molded over a portion of the molded Nylon part using a two-shot injection molding machine with suitable mold that could perform the two shot operation.

According to other illustrative embodiments, a Nylon part and the thermoplastic elastomeric overmold composition may be bonded together via a welding operation initiated by heat, infra-red radiation, or ultraviolet energy.

According to other illustrative embodiments, a Nylon part and the thermoplastic elastomeric overmold composition may be bonded together via mechanical bonding with a suitable amount of adhesive.

An overmolded shaped article made from a polyamide is provided. In particular, an article having a layer of a thermoplastic elastomer composition overmolded to at least a portion of the surface of the article is provided, the thermoplastic elastomer comprising a thermoplastic vulcanizate, an olefinic block copolymer, a functionalized polyolefin copolymer, and optionally a hydrogenated styrene block copolymer.

The article having a layer of a thermoplastic elastomer composition overmolded to at least a portion of the surface of the article is provided, the thermoplastic elastomer comprising a thermoplastic vulcanizate, an olefinic block copolymer, a maleic anhydride functionalized polyolefin copolymer, and optionally a hydrogenated styrene block copolymer.

The article having a layer of a thermoplastic elastomer composition overmolded to at least a portion of the surface of the article is provided, the thermoplastic elastomer comprising a thermoplastic vulcanizate, an olefinic block copolymer, a maleic anhydride functionalized polyolefin copolymer, and optionally a styrene ethylene butylene styrene (SEBS) block copolymer.

An article having a layer of a thermoplastic elastomer composition overmolded to at least a portion of the surface of the article is provided, comprising a method of bonding the thermoplastic elastomer composition to a predominantly polyamide substrate, the thermoplastic elastomer composition comprising a thermoplastic vulcanizate, an olefinic block copolymer, a functionalized polyolefin copolymer, and optionally a hydrogenated styrene block copolymer, the process comprising heating the thermoplastic elastomer composition to a temperature in the range from about 150 C to about 300 C, followed by applying the heated composition to at least a portion of the predominantly polyamide substrate.

By way of illustration, and without limitation, examples of overmolded shaped articles from the provided thermoplastic elastomer compositions may include the handle of a hand tool such as a screwdriver or a hammer, or a handle of a power tool such as a drill or saw.

EXAMPLES

The following examples are given solely for the purpose of illustration and are not to be construed as limitations of the present disclosure, as many variations of the invention are possible without departing from the spirit and scope of the present disclosure.

The following test methods were used to measure the physical properties of the inventive thermoplastic:

Shore A hardness testing performed in accordance with ASTM D2240,

Specific gravity measurements performed in accordance with ASTM

Capillary rheology testing protocol performed in accordance with ASTM D3835,

Tensile testing including Stress at Break, Modulus, Elongation at Break, Tear Strength performed in accordance with ASTM D412A, Tear Strength testing protocol performed in accordance with ASTM D624, 90° Peel Strength testing protocol performed in accordance with ASTM D6862.

Sample Preparation: Each of the different formulations was compounded on the twin screw extruder and pelletized. Pellet samples were used made standard plaques having the dimensions of 2"×4"×0.125" thickness. These plaques were kept at room temperature for 24 hours and were then used to perform various physical tests.

Shore A Hardness test: 5 pairs of plaques were used for test. Each pair were stacked together to create 0.250" thickness and kept on a uniform and stable bench top. Using Shore A durometer, 10 sec hardness measurement were taken at 3 points with each pair at 10 sec delay following the ASTM D2240 test method. Readings were recorded and average of 15 datapoints were reported as Shore A Hardness for the sample. The thermoplastic elastomeric composition may have a Shore A hardness of about 40 to about 90, about 45 to about 85, about 50 to about 80, about 50 to about 70, about 55 to about 75, about 60 to about 80, about 65 to about 75, about 70 to about 85, or about 70 to about 80.

Specific gravity test: A small portion of about ½ inch size is cut from the molded plaque and tested for specific gravity following the ASTM D792 test method.

Capillary rheology test: One molded plaque is cut into slices lengthwise and packed into a capillary rheometer barrel maintained at a temperature of about 210° C. Rheology is recorded at 10 different shear rates and is reported as such. The ASTM D3835 method was used for this test. The thermoplastic elastomeric composition exhibited a rheology at 210 C as measured in accordance with ASTM D3835 of about 15 to about 50 Pa*s, from about 15 to about 40 Pa*s, from about 15 to about 40 Pa*s, from about 15 to about 25 Pa*s, about 20 to about 50 Pa*s, from about 20 to about 40 Pa*s, from about 20 to about 30 Pa*s, about 25 to about 50 Pa*s, about 25 to about 35 Pa*S, about 30 to about 50 Pa*s, about 30 to about 40 Pa*s, or about 40 to about 50 Pa*s.

Tensile test: 5 molded plaques are used for this test. Plaques were cut into test specimen using Die C in accordance with the ASTM protocol. The test specimen was held between two grips of tensile testing machine. The measurement is started when the specimen is stretched lengthwise until it breaks. The instrument records modulus at various stretch (elongation) levels, tensile at break, elongation and tabulates it. 5 specimens are run using same setup to achieve average of the results and reported as such in accordance with ASTM D412A. The thermoplastic elastomeric composition exhibited a Tensile Stress at Break of about 450 to about 900 psi, from about 500 to about 900 psi, from about 500 to about 800 psi, from about 500 to about 700 psi, from about 500 to about 600 psi, from about 600 to about 900 psi, from about 600 to about 800 psi, from about 600 to about 700 psi, from about 700 to about 900 psi, from about 800 to about 900 and psi. The thermoplastic elastomeric composition exhibited a 300% modulus (psi) of about 300 to about 800 psi, from about 300 to about 700 psi, from about 300 to about 600 psi, from about 300 to about 500 psi, from about 300 to about 400 psi, from about 400 to about 800 psi, from about 400 to about 700 psi, from about 400 to about 600 psi, from about 400 to about 600 psi, from about 500 to about 800, psi, from about 500 to about 700 psi, from about 500 to about 600 psi, from about 600 to about 800 psi, and from about 700 to about 800 psi. The thermoplastic elastomeric composition exhibited an Elongation at Break (%) of about 250 to about 700%, from about 250 to about 600%, from about 250 to about 500%, from about 400 to about 600%, from about 400 to about 500%, and from about 500 to about 600%.

Tear strength test: 3 molded plaques are used for this test. Plaques are cut into test specimen using Die of the ASTM protocol. The test specimen was held between two grips of tear testing machine. The measurement is started when the specimen is stretched lengthwise until it breaks. The instrument records the 90° tear strength in pli. 3 test specimens are used to achieve multiple data and average is reported as such following ASTM D624. The thermoplastic elastomeric composition exhibited a Tear Strength (pli) of about 200 to about 750 pli, about 350 to about 750 pli, about 350 to about 550 pli, about 200 to about 450 pli, about 200 to about 350 pli, about 250 to about 375 pli, and about 250 to about 450 pli.

Peel strength test: Pellets samples of each formulation were overmolded onto commercially available substrate strips of polycarbonate, nylon 6,6 and ABS resin of certain thickness. These bonded strips of 1-inch width and 4 inch long 5 specimens were subjected to 90° peel test following ASTM D6862 using tensile tester with attached peel test fixture. The measurement is started when the tensile grip starts peeling the overmolded resin from the substrate. The peel strength is measured as the force that is required in pli to peel the overmolded resin from the substrate. The maximum force is recorded in average of 5 test specimens. The thermoplastic elastomer composition exhibited a peel strength (pli) of about 5 to about 50 pli, from about 5 to about 20 pli, from about 5 to about 15 pli, from about 5 to about 10 pli, 10 to about 50 pli, from about to about 40 pli, from about 10 to about 30 pli, from about 10 to 20 pli, from about 10 to about 15 pli, from about 15 to about 45 pli, from about 15 to about 40 pli, from about to about 35 pli, from about 15 to about 30 pli, from about 15 to about 25 pli, about 20 to about 25 pli, from about 20 to about 50 pli, from about 20 to abut 45 pli, from about 20 to about 40 pli, from about 20 to about 35 pli, and from about 20 to about 25 pli.

Measured properties for thermoplastic elastomer compositions are listed for the various examples in Tables 1-5 below.

The following components were used to prepare the sample formulations of the thermoplastic elastomer overmold composition:

Santoprene RC8001 is a thermoplastic vulcanizate of EPDM and polypropylene commercially available from ExxonMobil.

LCY 9551 refers to Globalprene® 9551 Styrene Ethylene Butylene Styrene (SEBS) block copolymer available from Lee Chang Yung Chemical Industry Corp.

LCY 7550 refers to Globalprene® 7550 Styrene Ethylene Butylene Styrene (SEBS) block copolymer available from Lee Chang Yung Chemical Industry Corp.

Exxelor™ VA 1801 is a medium viscosity, semi-crystalline ethylene copolymer functionalized with maleic anhydride by reactive extrusion, available from ExxonMobil.

Exxelor™ VA 1803 is a high flow, semi-crystalline ethylene copolymer functionalized with maleic anhydride by reactive extrusion, available from ExxonMobil.

Exxelor™ PO 1020 is a homopolypropylene functionalized with maleic anhydride by reactive extrusion, available from ExxonMobil.

Petrothene™ NA 443-023 is a Low density Polyethylene commercially available from Lyondell.

Dow Infuse™ 9500 is an olefin block copolymer available from The Dow Chemical Company.

Dow Infuse™ 9507 is an olefin block copolymer available from The Dow Chemical Company.

Dow Infuse™ 9900 is an olefin block copolymer available from The Dow Chemical Company.

Paralux™ 6001 is a paraffinic process oil available from ChevronTexaco.

Irgafos® 168 is a phosphite antioxidant and heat stabilizer available from BASF.

Irganox® 1010 is a phenolic primary antioxidant and heat stabilizer available from BASF.

Polybond 3000 and 3150 are maleic anhydride functionalized polyolefins commercially available from Univar.

The amounts of each of the components of the thermoplastic elastomeric overmold compositions set forth in the Tables below in "phr". The term "phr" means. As used herein, the term "phr" means parts per one hundred parts rubber.

TABLE 1

| | Example | | | | |
|---|---|---|---|---|---|
| | 1 | 2 | 3 | 4 | 5 |
| Santoprene RC8001 (phr) | 50 | 50 | 50 | 50 | 50 |
| LCY 9551 (phr) | | | | 25 | |
| LCY 7550 (phr) | | | | | 25 |
| Exxelor VA 1801 (phr) | 42.857 | 42.857 | 42.857 | 42.857 | 42.857 |
| PE NA 443-023 (phr) | 25.3 | 25.3 | 50 | 50 | 50 |
| Dow Infuse 9507 (phr) | 50 | | | | |
| Dow Infuse 9900 (phr) | | 50 | 50 | 50 | 50 |
| Paralux 6001 (phr) | | | | 25 | 25 |
| Irgafos 168 (phr) | 0.168 | 0.168 | 0.191 | 0.24 | 0.24 |
| Irganox 1010 (phr) | 0.168 | 0.168 | 0.191 | 0.24 | 0.24 |
| Total Weight | 168.493 | 168.493 | 193.239 | 243.337 | 243.337 |
| Hardness [Shore A]: | 66 A | 86 A | 72 A | 70 A | 69 A |
| Specific Gravity [g/cm$^3$]: | 0.890 | 0.890 | 0.890 | 0.890 | 0.890 |
| Rheology (@210° C.) [Pa*s]: | 42.6 | 55.6 | 40.6 | 34.5 | 34.2 |
| Tensile Stress at Break [psi]: | 587 | 858 | 683 | 670 | 661 |
| 300% modulus, psi | 438 | 709 | 528 | 500 | 515 |
| Elongation, % | 610 | 582 | 602 | 572 | 552 |
| Tear strength, pli | 377 | 710 | 475 | 517 | 475 |
| Color | Natural | Natural | Natural | Natural | Natural |
| Clarity | Translucent | Translucent | Opaque | Opaque | Opaque |
| Peel strength, pli | 14.0 | 29.7 | 25.4 | 25.7 | 19.0 |

TABLE 2

| | Example | | | | |
|---|---|---|---|---|---|
| | 6 | 7 | 8 | 9 | 10 |
| Santoprene RC8001 (phr) | 50 | 50 | 50 | 50 | 50 |
| Exxelor VA 1801 (phr) | 42.857 | — | 10 | 20 | 30 |
| PE NA 443-023 (phr) | 50 | 25.3 | 25.3 | 25.3 | 25.3 |
| Dow Infuse 9507 (phr) | — | 50 | 50 | 50 | 50 |
| Dow Infuse 9900 (phr) | 50 | — | — | — | — |
| Irgafos 168 (phr) | 0.24 | 0.168 | 0.168 | 0.168 | 0.168 |
| Irganox 1010 (phr) | 0.24 | 0.168 | 0.168 | 0.168 | 0.168 |
| Total Weight | 193.337 | 125.636 | 135.636 | 145.636 | 155.636 |
| Hardness [Shore A]: | 74 A | 68 A | 66 A | 70 A | 70 A |
| Specific Gravity [g/cm$^3$]: | 0.890 | 0.890 | 0.890 | 0.890 | 0.890 |
| Rheology (@210° C.) [Pa*s]: | 34.9 | 28.3 | 32.2 | 36.3 | 39.4 |
| Tensile Stress at Break [psi]: | 740 | 555 | 569 | 590 | 603 |
| 300% modulus, psi | 558 | 431 | 457 | 563 | 461 |
| Elongation, % | 571 | 602 | 554 | 551 | 576 |
| Tear strength, pli | 518 | 353 | 402 | 408 | 418 |
| Color | Natural | Natural | Natural | Natural | Natural |
| Clarity | Translucent | Translucent | Translucent | Translucent | Translucent |
| Peel strength, pli | 19.4 | 6.2 | 9.5 | 19.2 | 23.1 |

TABLE 3

| | Example | | | | |
|---|---|---|---|---|---|
| | 11 | 12 | 13 | 14 | 15 |
| Santoprene RC8001 (phr) | 50 | 50 | 50 | 50 | 50 |
| LCY 9551 (phr) | 25 | 25 | 25 | 25 | 25 |
| LCY 7550 (phr) | — | — | — | — | — |
| Exxelor VA 1801 (phr) | — | — | — | — | — |
| Exxelor PO 1020 (phr) | — | 10 | 20 | 30 | 42.857 |
| PE NA 443-023 (phr) | — | — | — | — | — |
| Dow Infuse 9507 (phr) | — | — | — | — | — |
| Dow Infuse 9900 (phr) | 50 | 50 | 50 | 50 | 50 |
| Paralux 6001 (phr) | 25 | 25 | 25 | 25 | 25 |
| Irgafos 168 (phr) | 0.168 | 0.168 | 0.191 | 0.24 | 0.24 |

TABLE 3-continued

|  | Example | | | | |
|---|---|---|---|---|---|
|  | 11 | 12 | 13 | 14 | 15 |
| Irganox 1010 (phr) | 0.168 | 0.168 | 0.191 | 0.24 | 0.24 |
| Total Weight | 150.336 | 160.336 | 170.382 | 180.48 | 193.337 |
| Hardness [Shore A]: | 51 A | 63 A | 71 A | 78 A | 84 A |
| Specific Gravity [g/cm$^3$]: | 0.890 | 0.890 | 0.890 | 0.890 | 0.890 |
| Rheology (@210° C.) [Pa*s]: | 21.9 | 19.0 | 17.4 | 15.4 | 14.1 |
| Tensile Stress at Break [psi]: | 513 | 532 | 539 | 571 | 605 |
| 300% modulus, psi | 336 | 437 | 486 | 550 | — |
| Elongation, % | 562 | 494 | 450 | 386 | 276 |
| Tear strength, pli | 235 | 309 | 348 | 405 | 429 |
| Color | Natural | Natural | Natural | Natural | Natural |
| Clarity | Translucent | Translucent | Translucent | Translucent | Opaque |
| Peel strength, pli | 7.3 | 29.6 | 36.3 | 46.5 | 27.9 |

TABLE 4

|  | Example | | | | |
|---|---|---|---|---|---|
|  | 16 | 17 | 18 | 19 | 20 |
| Santoprene RC8001 (phr) | 50 | 50 | 50 | 50 | 50 |
| LCY 9551 (phr) | 25 | 25 | 25 | 25 | 25 |
| LCY 7550 (phr) | — | — | — | — | — |
| Exxelor VA 1801 (phr) | — | — | — | 42.857 | 10 |
| Exxelor PO 1020 (phr) | 10 | 20 | 30 | — | — |
| Dow Infuse 9900 (phr) | — | — | — | — | 50 |
| Dow Infuse 9500 (phr) | 10 | 20 | 30 | 42.857 | — |
| Paralux 6001 (phr) | 25 | 25 | 25 | 25 | 25 |
| Irgafos 168 (phr) | 0.168 | 0.168 | 0.168 | 0.168 | 0.168 |
| Irganox 1010 (phr) | 0.168 | 0.168 | 0.168 | 0.168 | 0.168 |
| Total Weight | 120.336 | 140.336 | 160.336 | 186.05 | 160.336 |
| Hardness [Shore A]: | 45 A | 50 A | 51 A | 59 A | 55 A |
| Specific Gravity [g/cm$^3$]: | 0.890 | 0.890 | 0.890 | 0.890 | 0.890 |
| Rheology (@210° C.) [Pa*s]: | 26.3 | 28.2 | 28.6 | 40.0 | 27.4 |
| Tensile Stress at Break [psi]: | 471 | 518 | 547 | 622 | 566 |
| 300% modulus, psi | 364 | 370 | 358 | 421 | 366 |
| Elongation, % | 426 | 499 | 555 | 618 | 588 |
| Tear strength, pli | 222 | 262 | 282 | 361 | 284 |
| Color | Natural | Natural | Natural | Natural | Natural |
| Clarity | Translucent | Translucent | Opaque | Opaque | Opaque |
| Peel strength, pli | 2.1 | 20.8 | 24.4 | 16.8 | 4.7 |

TABLE 5

|  | Example | | | | |
|---|---|---|---|---|---|
|  | 21 | 22 | 23 | 24 | 25 |
| Santoprene RC8001 (phr) | 50 | 50 | 50 | 50 | 50 |
| LCY 9551 (phr) | 25 | 25 | 25 | 25 | 25 |
| LCY 7550 (phr) | — | — | — | — | — |
| Exxelor VA 1801 (phr) | 20 | 30 | 42.857 | — | — |
| Exxelor PO 1020 (phr) | — | — | — | 30 | 42.857 |
| Polybond 3000 (phr) | — | — | — | 10 | 20 |
| Dow Infuse 9900 (phr) | 50 | 50 | 50 | 50 | 50 |
| Paralux 6001 (phr) | 25 | 25 | 25 | 25 | 25 |
| Irgafos 168 (phr) | 0.168 | 0.168 | 0.168 | 0.168 | 0.168 |
| Irganox 1010 (phr) | 0.168 | 0.168 | 0.168 | 0.168 | 0.168 |
| Total Weight | 170.336 | 180.336 | 192.857 | 190.336 | 212.857 |
| Hardness (Shore A] | 59 A | 56 A | 60 A | 60 A | 50 A |
| Specific Gravity [g/cm$^3$]: | 0.890 | 0.890 | 0.890 | 0.890 | 0.890 |
| Rheology (@210° C.) [Pa*s]: | 30.3 | 33.2 | 35.5 | 20.1 | 28.2 |
| Tensile Stress at Break [psi]: | 575 | 549 | 649 | 464 | 518 |
| 300% modulus, psi | 377 | 375 | 385 | 345 | 370 |
| Elongation, % | 593 | 576 | 656 | 539 | 499 |

TABLE 5-continued

| | Example | | | | |
|---|---|---|---|---|---|
| | 21 | 22 | 23 | 24 | 25 |
| Tear strength, pli | 304 | 321 | 364 | 275 | 262 |
| Color | Natural | Natural | Natural | Natural | Natural |
| Clarity | Translucent | Translucent | Opaque | Opaque | Opaque |
| Peel strength, pli | 10.4 | 11.9 | 14.5 | 13.9 | 19.0 |

TABLE 6

| | Example | | | | | |
|---|---|---|---|---|---|---|
| | 26 | 27 | 28 | 29 | 30 | 31 |
| Santoprene RC8001 (phr) | 50 | 50 | 50 | 50 | 50 | 50 |
| LCY 9551 (phr) | 25 | 25 | 25 | 25 | 25 | 25 |
| LCY 7550 (phr) | — | — | — | — | — | — |
| Exxelor VA 1801 (phr) | — | — | — | — | — | — |
| Exxelor PO 1020 (phr) | — | — | — | — | — | — |
| PE NA 443-023 (phr) | — | — | — | — | — | — |
| Polybond 3000 (phr) | 30 | 42.857 | — | — | — | — |
| Polybond 3150 (phr) | — | — | 10 | 20 | 30 | 42.857 |
| Dow Infuse 9507 (phr) | — | — | — | — | — | — |
| Dow Infuse 9900 (phr) | 50 | 50 | 50 | 50 | 50 | 50 |
| Paralux 6001 (phr) | 25 | 25 | 25 | 25 | 25 | 25 |
| Irgafos 168 (phr) | 0.168 | 0.168 | 0.168 | 0.168 | 0.168 | 0.168 |
| Irganox 1010 (phr) | 0.168 | 0.168 | 0.168 | 0.168 | 0.168 | 0.168 |
| Total Weight | 180.336 | 192.857 | 160.336 | 170.336 | 180.336 | 192.857 |
| Hardness [Shore A]: | 76 A | 85 A | 64 A | 78 A | 50 A | 86 A |
| Specific Gravity [g/cm$^3$]: | 0.890 | 0.890 | 0.890 | 0.890 | 0.890 | 0.890 |
| Rheology (@210° C.) [Pa*s]: | 17.5 | 16.6 | 22.9 | 15.4 | 28.2 | 17.4 |
| Tensile Stress at Break [psi]: | 499 | 603 | 522 | 571 | 518 | 776 |
| 300% modulus, psi | 479 | — | 397 | 550 | 370 | 772 |
| Elongation, % | 375 | 256 | 520 | 386 | 499 | 342 |
| Tear strength, pli | 363 | 437 | 281 | 405 | 262 | 479 |
| Color | Natural | Natural | Natural | Natural | Natural | Natural |
| Clarity | Translucent | Translucent | Translucent | Translucent | Translucent | Translucent |
| Peel strength, pli | 25.5 | 29.7 | 9.8 | 14.4 | 24.8 | 19.7 |

TABLE 7

| | Example | | | | | | |
|---|---|---|---|---|---|---|---|
| | 32 | 33 | 34 | 35 | 36 | 37 | 38 |
| Santoprene RC8001 (phr) | 50 | 50 | 50 | 50 | 50 | 50 | 50 |
| Dow Infuse 9900 (phr) | 50 | 50 | 50 | 50 | 50 | 50 | 50 |
| Exxelor VA 1801 (phr) | 42.857 | 42.857 | 42.857 | 37 | 32 | 27 | 22 |
| PE NA 443-023 (phr) | 50 | 50 | 50 | 50 | 50 | 50 | 50 |
| Irganox 1010 (phr) | 0.191 | 0.191 | 0.191 | 0.191 | 0.191 | 0.191 | 0.191 |
| Irgafos 168 (phr) | 0.191 | 0.191 | 0.191 | 0.191 | 0.191 | 0.191 | 0.191 |
| Vicron 25-11 (phr) | — | 30 | 40 | 10 | 20 | 30 | 40 |
| Hardness [Shore A] | 83 | 85 | 85 | 84 | 85 | 85 | 85 |
| Specific Gravity [g/cm$^3$] | 0.89 | 0.96 | 0.98 | 0.93 | 0.93 | 0.96 | 0.99 |
| Tensile strength, pli | 835 | 887 | 882 | 844 | 871 | 883 | 867 |
| 300% Modulus, psi | 662 | 762 | 773 | 726 | 753 | 793 | 790 |
| Elongation, % | 525 | 522 | 523 | 485 | 509 | 472 | 460 |
| Tear Strength, pli | 577 | 611 | 675 | 609 | 629 | 600 | 620 |
| Rheology (@210° C.) [Pa*s] | 40.9 | 43.9 | 44.8 | 39.8 | 40 | 39.4 | 39.1 |
| Peel strength on Nylon 6/6, pli | 41.6 | 31.6 | 33.9 | — | — | — | — |
| Color | Natural | Natural | Natural | Natural | Natural | Natural | Natural |
| Clarity | Opaque | Opaque | Opaque | Opaque | Opaque | Opaque | Opaque |

TABLE 8

| | Example | | | | | | | |
|---|---|---|---|---|---|---|---|---|
| | 39 | 40 | 41 | 42 | 43 | 44 | 45 | 46 |
| Santoprene RC8001 (phr) | 50 | 50 | 50 | 50 | 50 | 50 | 50 | 50 |
| Dow Infuse 9900 (phr) | 50 | 50 | 50 | 50 | 50 | 50 | 50 | 50 |
| Exxelor VA 1801 (phr) | 42.857 | 42.857 | 42.857 | 42.857 | 37 | 32 | 27 | 22 |
| PE NA 443-023 (phr) | 50 | 50 | 50 | 50 | 50 | 50 | 50 | 50 |
| LCY 9551(phr) | 25 | 25 | 25 | 25 | 25 | 25 | 25 | 25 |
| Paralux 6001(phr) | 25 | 25 | 25 | 25 | 25 | 25 | 25 | 25 |
| Irganox 1010 (phr) | 0.24 | 0.24 | 0.24 | 0.24 | 0.24 | 0.24 | 0.24 | 0.24 |
| Irgafos 168 (phr) | 0.24 | 0.24 | 0.24 | 0.24 | 0.24 | 0.24 | 0.24 | 0.24 |
| Vicron 25-11(phr) | — | 30 | 40 | 50 | 10 | 20 | 30 | 40 |
| Hardness [Shore A] | 75 | 75 | 80 | 80 | 79 | 76 | 78 | 79 |
| Specific Gravity [g/cm$^3$] | 0.88 | 0.92 | 0.95 | 0.97 | 0.91 | 0.92 | 0.94 | 0.96 |
| Tensile strength, pli | 680 | 655 | 766 | 790 | 808 | 831 | 842 | 839 |
| 300% Modulus, psi | 511 | 522 | 653 | 648 | 586 | 589 | 590 | 622 |
| Elongation, % | 529 | 517 | 512 | 573 | 621 | 634 | 675 | 651 |
| Tear Strength, pli | 448 | 446 | 576 | 608 | 567 | 582 | 572 | 573 |
| Rheology (@210° C.) [Pa*s] | 37.4 | 38.4 | 36.9 | 39.6 | 38.2 | 36.3 | 35.1 | 34.8 |
| Peel strength on Nylon 6/6, pli | 27.2 | 33.6 | — | — | — | 38 | — | — |
| Color | Natural | Natural | Natural | Natural | Natural | Natural | Natural | Natural |
| Clarity | Translucent | Opaque | Opaque | Opaque | Opaque | Opaque | Opaque | Opaque |

TABLE 9

| | Example | | | | | | |
|---|---|---|---|---|---|---|---|
| | 47 | 48 | 49 | 50 | 51 | 52 | 53 |
| Santoprene RC8001 (phr) | 50 | 50 | 50 | 50 | 50 | 50 | 50 |
| Dow Infuse 9900 (phr) | 50 | 50 | 50 | 50 | 50 | 50 | 50 |
| Exxelor VA 1801 (phr) | 22 | 22 | 22 | 42.857 | 42.857 | 42.857 | 42.857 |
| PE NA 443-023 (phr) | 55 | 60 | 65 | 55 | 55 | 55 | 55 |
| LCY 9551(phr) | 25 | 25 | 25 | 25 | 25 | 25 | 25 |
| Paralux 6001(phr) | 50 | 60 | 65 | 70 | 80 | 90 | 90 |
| Irganox 1010 (phr) | 0.24 | 0.24 | 0.24 | 0.24 | 0.24 | 0.24 | 0.24 |
| Irgafos 168 (phr) | 0.24 | 0.24 | 0.24 | 0.24 | 0.24 | 0.24 | 0.24 |
| Vicron 25-11(phr) | 40 | 40 | 40 | 40 | 40 | 40 | 40 |
| PP 535 black(phr) | — | — | — | — | — | — | 7.2 |
| Hardness [Shore A] | 75 | 73 | 75 | 70 | 66 | 65 | 65 |
| Specific Gravity [g/cm$^3$] | 0.96 | 0.96 | 0.95 | 0.94 | 0.94 | 0.94 | 0.93 |
| Tensile strength, pli | 590 | 513 | 538 | 533 | 478 | 506 | 504 |
| 300% Modulus, psi | 501 | 430 | 443 | 432 | 374 | 386 | 379 |
| Elongation, % | 501 | 518 | 529 | 538 | 586 | 649 | 618 |
| Tear Strength, pli | 435 | 383 | 409 | 385 | 342 | 365 | 367 |
| Rheology (@210° C.) [Pa*s] | 28.2 | 23.7 | 25.4 | 25 | 22.3 | 21.7 | 20.9 |
| Peel strength on Nylon 6/6, pli | 29 | 27 | 14 | 34 | 29 | 28 | 35 |
| Color | Natural | Natural | Natural | Natural | Natural | Natural | Natural |
| Clarity | Opaque | Opaque | Opaque | Opaque | Opaque | Opaque | Opaque |

TABLE 10

| | Example | | | | | | | |
|---|---|---|---|---|---|---|---|---|
| | C54 | 55 | 56 | 57 | 58 | C59 | 60 | 61 |
| Santoprene RC8001 (phr) | | 50 | 50 | 50 | 50 | | 50 | 50 |
| Dow Infuse 9900 (phr) | | 50 | 50 | 50 | 50 | | 50 | 50 |
| Exxelor VA 1801 (phr) | | 42.857 | 38 | 38 | 38 | | 42.857 | 42.857 |
| PE NA 443-023 (phr) | | 45 | 48 | 48 | 48 | | 50 | 50 |
| LCY 9551 (phr) | | 25 | 25 | — | — | | — | — |
| Taipol 6151(phr) | | — | — | 25 | 25 | | 25 | 25 |
| Paralux 6001(phr) | | 90 | 90 | 93.5 | 93.5 | | 27 | 27 |
| Irganox 1010 (phr) | | 0.24 | 0.24 | 0.24 | 0.24 | | 0.24 | 0.24 |
| Irgafos 168 (phr) | | 0.24 | 0.24 | 0.24 | 0.24 | | 0.24 | 0.24 |
| Vicron 25-11(phr) | | 40 | 40 | 120 | 120 | | 91.5 | 91.5 |
| PP 535 Black(phr) | | — | — | — | 8.675 | | — | 6.875 |
| Hardness [Shore A] | 60 | 60 | 61 | 60 | 61 | 76 | 75 | 76 |
| Specific Gravity [g/cm$^3$] | 1.077 | 0.945 | 0.946 | 1.065 | 1.068 | 1.08 | 1.057 | 1.057 |
| Tensile strength, pli | 445 | 462 | 469 | 464 | 505 | 575 | 696 | 755 |

TABLE 10-continued

| | Example | | | | | | | |
|---|---|---|---|---|---|---|---|---|
| | C54 | 55 | 56 | 57 | 58 | C59 | 60 | 61 |
| 300% Modulus, psi | 420 | 376 | 381 | 431 | 481 | 582 | 678 | 726 |
| Elongation, % | 435 | 539 | 525 | 455 | 418 | 287 | 378 | 415 |
| Tear Strength, pli | 304 | 338 | 339 | 351 | 394 | 410 | 506 | 580 |
| Rheology (@210° C.) [Pa*s] | 29.2 | 22.5 | 19.9 | 22.4 | 22.5 | 26.4 | 38.8 | 38.9 |
| Peel strength on Nylon 6/6, pli | 5 | — | 10 | — | — | 6 | — | — |
| Peel strength on 33% glass-filled Nylon 6/6, pli | 13 | — | 14 | — | — | 21 | — | — |
| Color | Natural | Natural | Natural | Natural | Black | Black | Natural | Black |
| Clarity | Opaque | Opaque | Opaque | Opaque | Opaque | Opaque | Opaque | Opaque |

While the thermoplastic elastomer composition for overmolding a predominantly polyamide substrate, the method for the preparation of an overmolded article, and the overmolded article having a layer of thermoplastic elastomer have been described in connection with various illustrative embodiments, it will be understood that the embodiments described herein are merely exemplary, and that one skilled in the art may make variations and modifications without departing from the spirit and scope of the embodiments. All such variations and modifications are intended to be included within the scope of the embodiments as described hereinabove. Further, all embodiments disclosed are not necessarily in the alternative, as various embodiments may be combined to provide the desired result. Therefore, the thermoplastic elastomer composition for overmolding a predominantly polyamide substrate, the method for the preparation of an overmolded article, and the overmolded article having a layer of thermoplastic elastomer shall not be limited to any single embodiment, but rather construed in breadth and scope in accordance with the recitation of the appended claims.

The invention claimed is:

1. A thermoplastic elastomer composition for overmolding a predominantly polyamide substrate, comprising:
   a thermoplastic vulcanizate;
   an olefinic block copolymer; and
   a compatibilizer,
   wherein the thermoplastic elastomer composition has a Shore A hardness as determined by ASTM D2240 test method of about 40 to about 90; and
   wherein the thermoplastic elastomer composition has 90° Peel Strength as determined by ASTM D6862 90° peel test method of about 10 (pli) to 50 (pli).

2. The thermoplastic elastomer composition of claim 1, wherein said compatibilizer comprises a functionalized polyolefin.

3. The thermoplastic elastomer composition of claim 2, wherein said functionalized polyolefin comprises an anhydride functionalized polyolefin.

4. The thermoplastic elastomer composition of claim 3, wherein said anhydride functionalized polyolefin comprises a carboxylic acid anhydride functionalized polyolefin.

5. The thermoplastic elastomer composition of claim 1, wherein said composition further comprising a hydrogenated styrenic block copolymer.

6. The thermoplastic elastomer composition of claim 5, wherein the hydrogenated styrenic block copolymer comprises styrene ethylene butylene styrene (SEBS) block copolymer.

7. The thermoplastic elastomer composition of claim 1, wherein the thermoplastic vulcanizate comprises thermoplastic elastomer and a polyolefin.

8. The thermoplastic elastomer composition of claim 7, wherein said thermoplastic elastomer comprises conjugated diene rubber, ethylene-alpha-olefin-diene monomer rubber, ethylene-alpha olefin rubber, unsaturated styrenic triblock copolymer rubber, hydrogenated styrenic triblock copoloymer rubber and combinations thereof.

9. The thermoplastic elastomer composition of claim 8, wherein said conjugated diene rubber is selected from styrene-butadiene rubber, polybutadiene rubber, polyisoprene rubber and combinations thereof.

10. The thermoplastic elastomer composition of claim 8, wherein said ethylene-alpha-olefin-diene monomer rubber is selected from terpolymers of ethylene-C3-C8 alpha olefins and non-conjugated diene.

11. The thermoplastic elastomer composition of claim 8, wherein said thermoplastic vulcanizate comprises ethylene-propylene-diene-monomer rubber (EPDM) and polypropylene.

12. The thermoplastic elastomer composition of claim 1, wherein said composition comprises a blend of two or more olefinic block copolymers.

13. The thermoplastic elastomer composition of claim 1, wherein the olefinic block copolymer comprise a two-component system comprising an elastomer dispersed in a polyolefin continuous phase.

14. The thermoplastic elastomer composition of claim 13, wherein the olefinic block copolymer comprises blocks of ethylene and C3-C20 alpha-olefin.

15. The thermoplastic elastomer composition of claim 1 comprises from about 20 to about 45 weight percent of said thermoplastic vulcanizate, from about 5 to about 40 weight percent of said olefinic block copolymer and from about 5 to about 25 weight percent of said compatibilizer, based on the total weight of the thermoplastic vulcanizate, the olefinic block copolymer and the compatibilizer.

16. The thermoplastic elastomer composition of claim 15 comprises from about 20 to about 36 weight percent of said thermoplastic vulcanizate, from about 10 to about 35 weight percent of said olefinic block copolymer and from about 7 to about 22 weight percent of said compatibilizer, based on the total weight of the thermoplastic vulcanizate, the olefinic block copolymer and the compatibilizer.

17. The thermoplastic elastomer composition of claim 16 comprises from about 20 to about 33 weight percent of said thermoplastic vulcanizate, from about 15 to about 25 weight percent of said olefinic block copolymer and from about 10 to about 18 weight percent of said compatibilizer, based on the total weight of the thermoplastic vulcanizate, the olefinic block copolymer and the compatibilizer.

18. The thermoplastic elastomer composition of claim 1 further comprising antioxidants, antiozonants, reinforcing and non-reinforcing fillers, fibers, extender oils, process oils, rubber plasticizers, heat stabilizers, waxes, UV light stabilizers, cross-linking agents, processing aids, lubricants, foaming agents, flame retardant packages, flow agents, rheology modifiers, tackifying agent, pigments, other coloring agents and combinations thereof.

19. The thermoplastic elastomer composition of claim 1 for overmolding a predominantly polyamide substrate, wherein the predominantly polyamide substrate comprises at least one of Nylon 6, Nylon 6/6, Nylon 6/12, Nylon 11, Nylon 12, reinforced Nylon, and heat-stabilized Nylon.

20. A method for the preparation of an overmolded article, comprising bonding a thermoplastic elastomer composition comprising a thermoplastic vulcanizate, an olefinic block copolymer and a compatibilizer to a predominantly polyamide substrate, wherein the thermoplastic elastomer composition has a Shore A hardness as determined by ASTM D2240 test method of about 40 to about 90 and wherein the thermoplastic elastomer composition has 90° Peel Strength as determined by ASTM D6862 90° peel test method of about 10 (pli) to 50 (pli) the bonding comprising heating the thermoplastic elastomer composition followed by applying the heated composition to at least a portion of the predominantly polyamide substrate without the use of an adhesive between the thermoplastic elastomer composition and the polyamide substrate.

21. The method of claim 20, wherein the thermoplastic elastomer composition is heated to a temperature in the range from about 150 C to about 250 C.

22. An article having a layer of the thermoplastic elastomer composition of claim 1 overmolded to at least a portion of the surface of the article.

23. An overmolded article prepared by the method of claim 20.

\* \* \* \* \*